(12) United States Patent
Bae

(10) Patent No.: US 11,390,061 B2
(45) Date of Patent: Jul. 19, 2022

(54) CURL REMOVING APPARATUS FOR MULTI-LAYER FILM

(71) Applicant: NPS CO., LTD., Cheongju-si (KR)

(72) Inventor: Seong Ho Bae, Daejeon (KR)

(73) Assignee: NPS CO., LTD., Cheongju-si (KR)

( * ) Notice: Subject to any disclaimer, the term of this patent is extended or adjusted under 35 U.S.C. 154(b) by 0 days.

(21) Appl. No.: 17/314,549

(22) Filed: May 7, 2021

(65) Prior Publication Data

US 2021/0347161 A1 Nov. 11, 2021

(30) Foreign Application Priority Data

May 9, 2020 (KR) .......................... 10-2020-0055511
May 4, 2021 (KR) .......................... 10-2021-0058084

(51) Int. Cl.

| | |
|---|---|
| *B29C 65/00* | (2006.01) |
| *B32B 43/00* | (2006.01) |
| *B32B 37/18* | (2006.01) |
| *B29C 65/78* | (2006.01) |
| *B29C 65/50* | (2006.01) |

(52) U.S. Cl.
CPC ............ *B32B 43/006* (2013.01); *B32B 37/18* (2013.01); *B29C 65/5042* (2013.01); *B29C 65/7847* (2013.01); *B29C 65/7855* (2013.01); *B29C 66/0224* (2013.01); *B29C 66/343* (2013.01)

(58) Field of Classification Search
CPC ... B32B 38/10; B32B 43/006; Y10T 156/195; Y10T 156/1174; B29C 65/5052; B29C 65/7847; B29C 65/7855; B29C 66/0224; B29C 66/343
See application file for complete search history.

(56) References Cited

U.S. PATENT DOCUMENTS

| | | | | | |
|---|---|---|---|---|---|
| 3,369,952 | A | * | 2/1968 | Rieger | B65C 11/004 156/577 |
| 4,328,061 | A | * | 5/1982 | Off | A41D 27/245 156/353 |
| 4,781,782 | A | * | 11/1988 | Luhman | B65H 35/0013 156/361 |
| 8,142,595 | B2 | * | 3/2012 | Kobayashi | H01L 21/67132 156/247 |
| 9,242,414 | B2 | * | 1/2016 | Ahn | B32B 38/10 |
| 2003/0037877 | A1 | * | 2/2003 | Brinkmann | B08B 7/0028 156/701 |

(Continued)

*Primary Examiner* — Philip C Tucker
*Assistant Examiner* — Nickolas R Harm

(57) ABSTRACT

A curl removing apparatus for a multilayer film for removing curl generated on a multilayer film including at least one of a first film having one surface on which a cohesive layer is formed and a second film attached to the cohesive layer includes a fixing unit configured to fix the first film, a separation unit including a separation roller having an outer circumference with a separation cohesive layer formed thereon, to which the second film is detachably attached, and a first roller driving member configured to drive and drive the separation roller to separate the second film attached to the separation cohesive layer from the cohesive layer of the first film while moving along the separation roller, and an attachment unit configured to reattach the second film separated from the cohesive layer of the first film to the cohesive layer of the first film.

15 Claims, 10 Drawing Sheets

(56) References Cited

U.S. PATENT DOCUMENTS

| | | | |
|---|---|---|---|
| 2006/0191633 A1* | 8/2006 | Hayasaka | B29C 63/0013 156/760 |
| 2007/0235131 A1* | 10/2007 | Tsujimoto | H01L 21/68714 156/714 |
| 2008/0185100 A1* | 8/2008 | Jang | G02F 1/1303 156/714 |
| 2008/0236743 A1* | 10/2008 | Kye | B32B 43/006 156/714 |
| 2009/0288760 A1* | 11/2009 | Garben | B41J 29/38 156/230 |
| 2015/0151531 A1* | 6/2015 | Ohno | H01L 51/524 156/755 |
| 2016/0159069 A1* | 6/2016 | Huang | B32B 43/006 156/707 |

* cited by examiner

【FIG. 1】
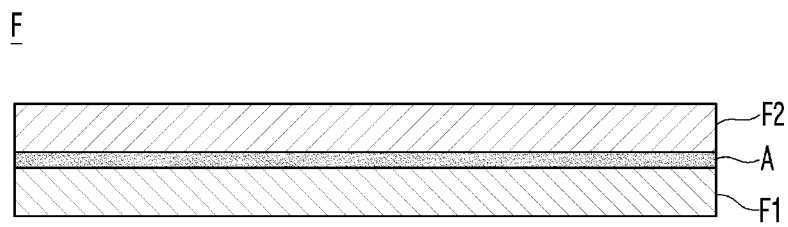

[FIG. 2]
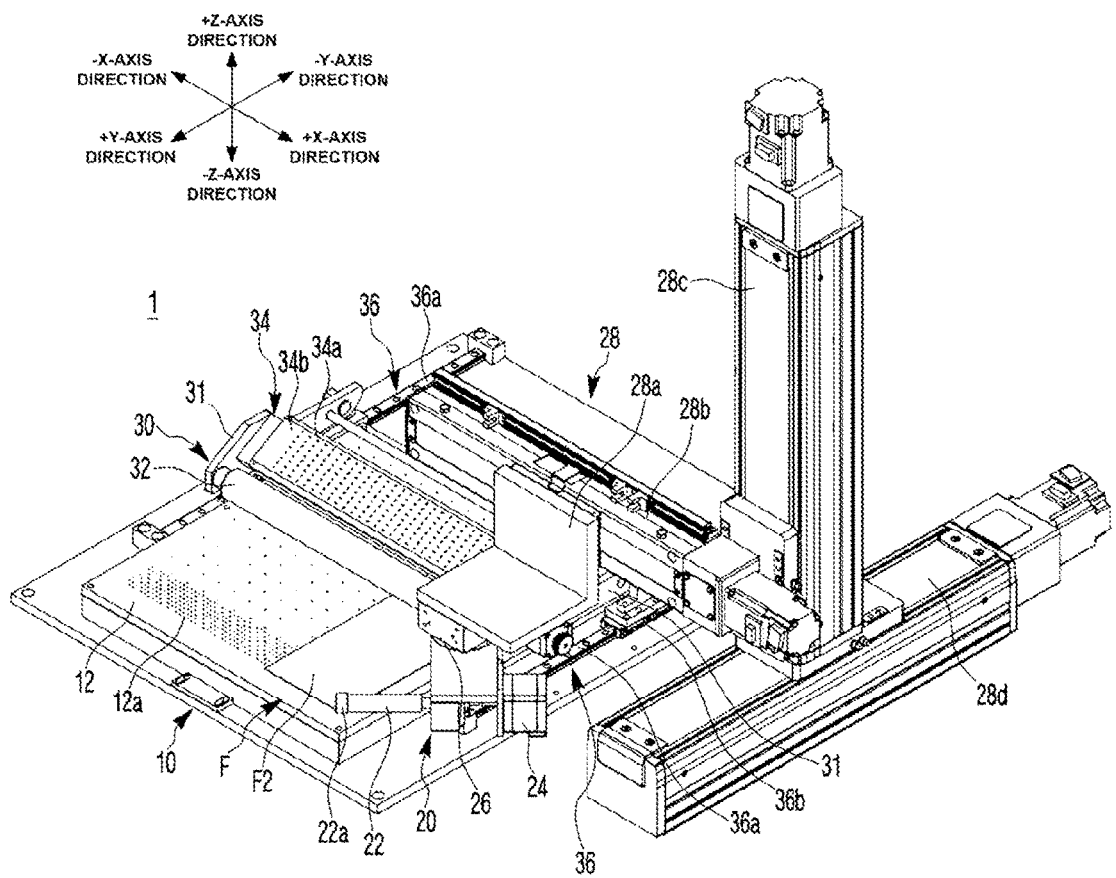

[FIG. 3]
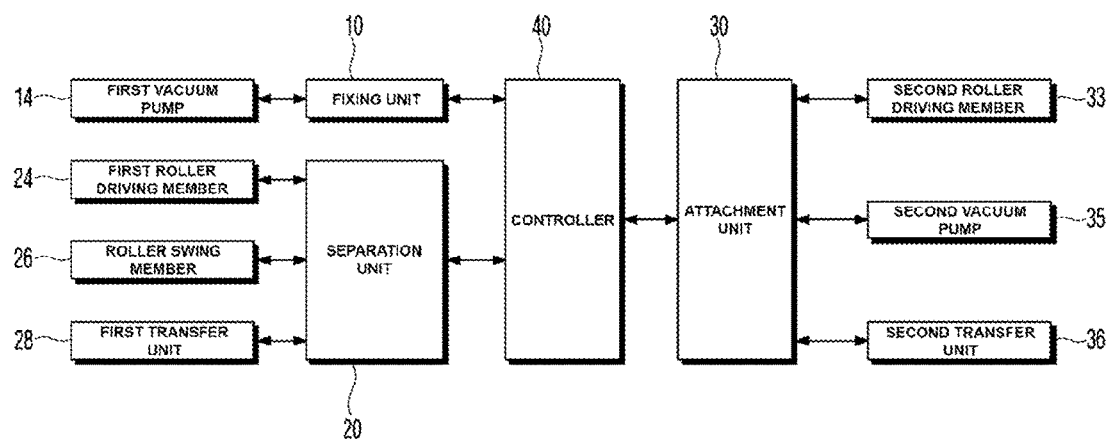

【FIG. 4】
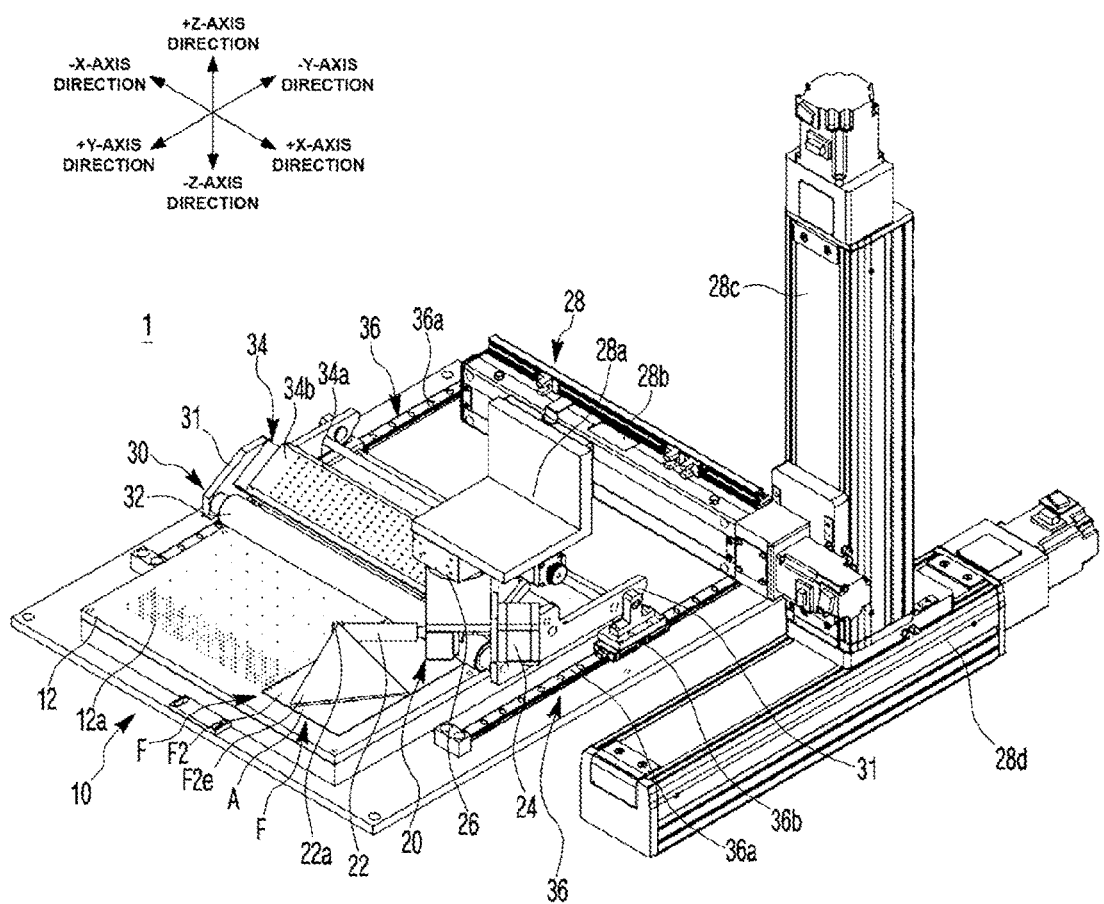

[FIG. 5]
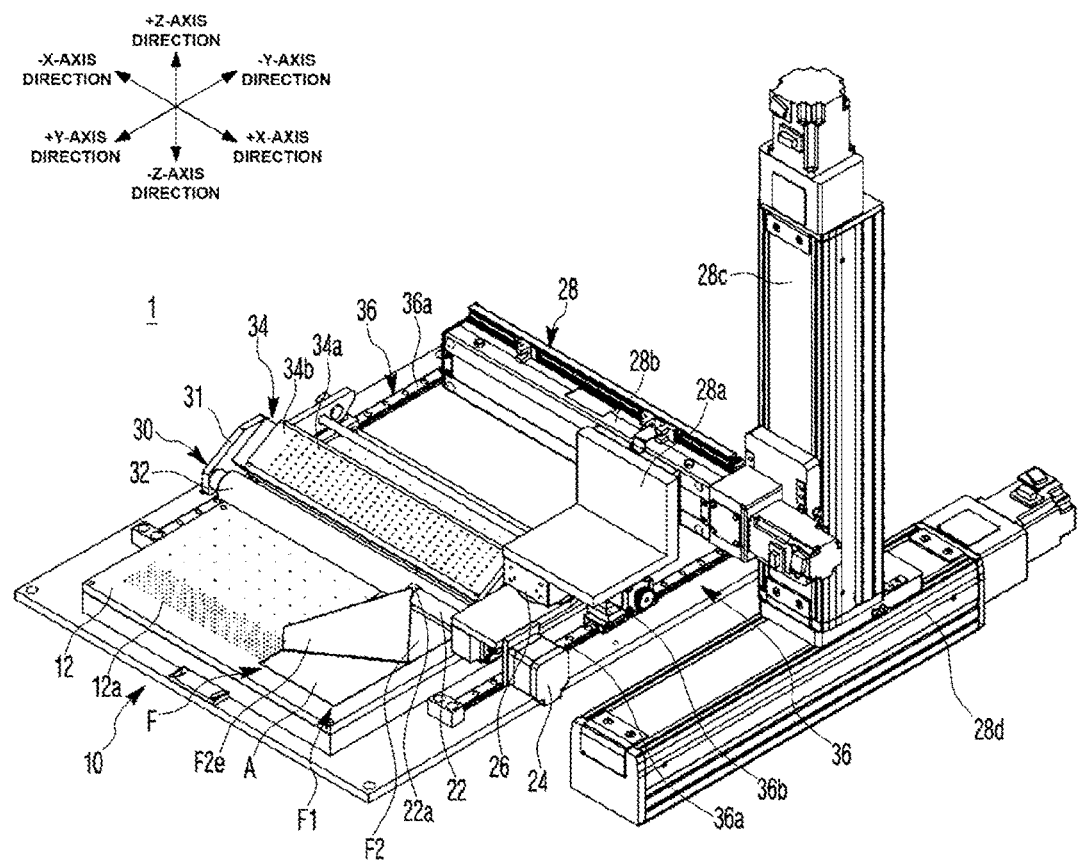

【FIG. 6】
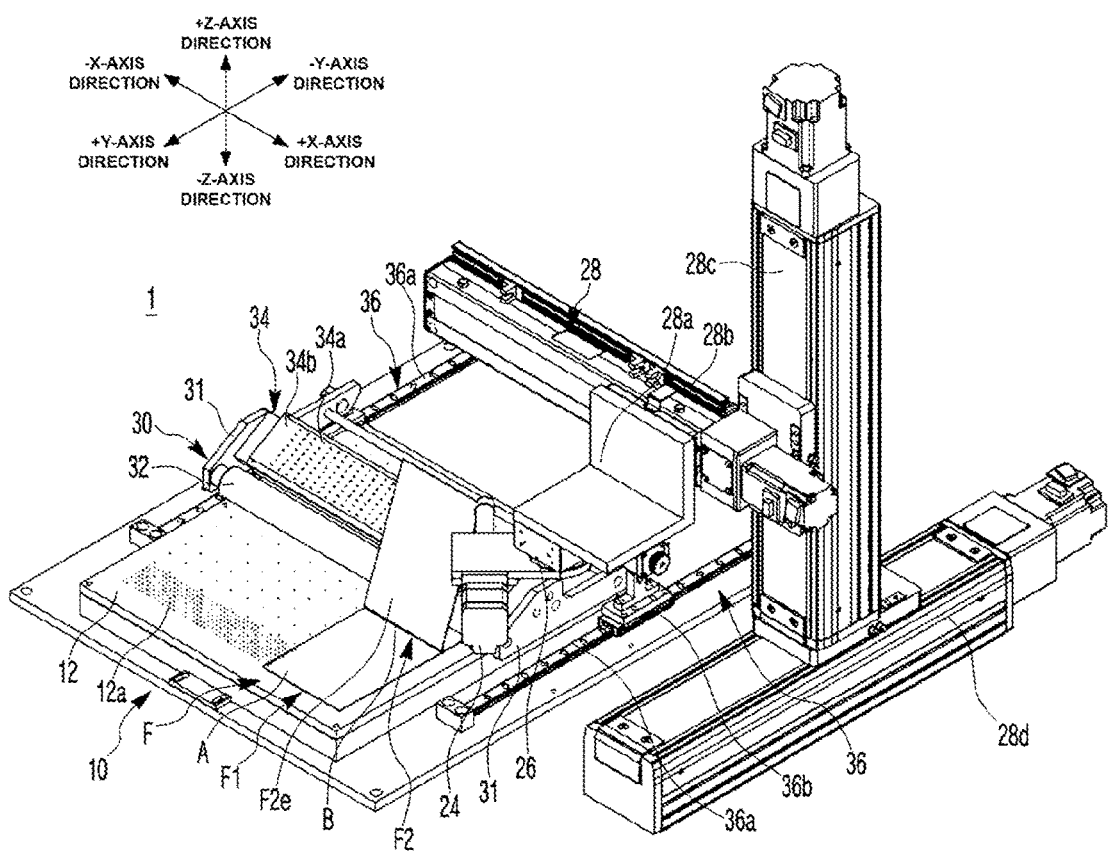

[FIG. 7]
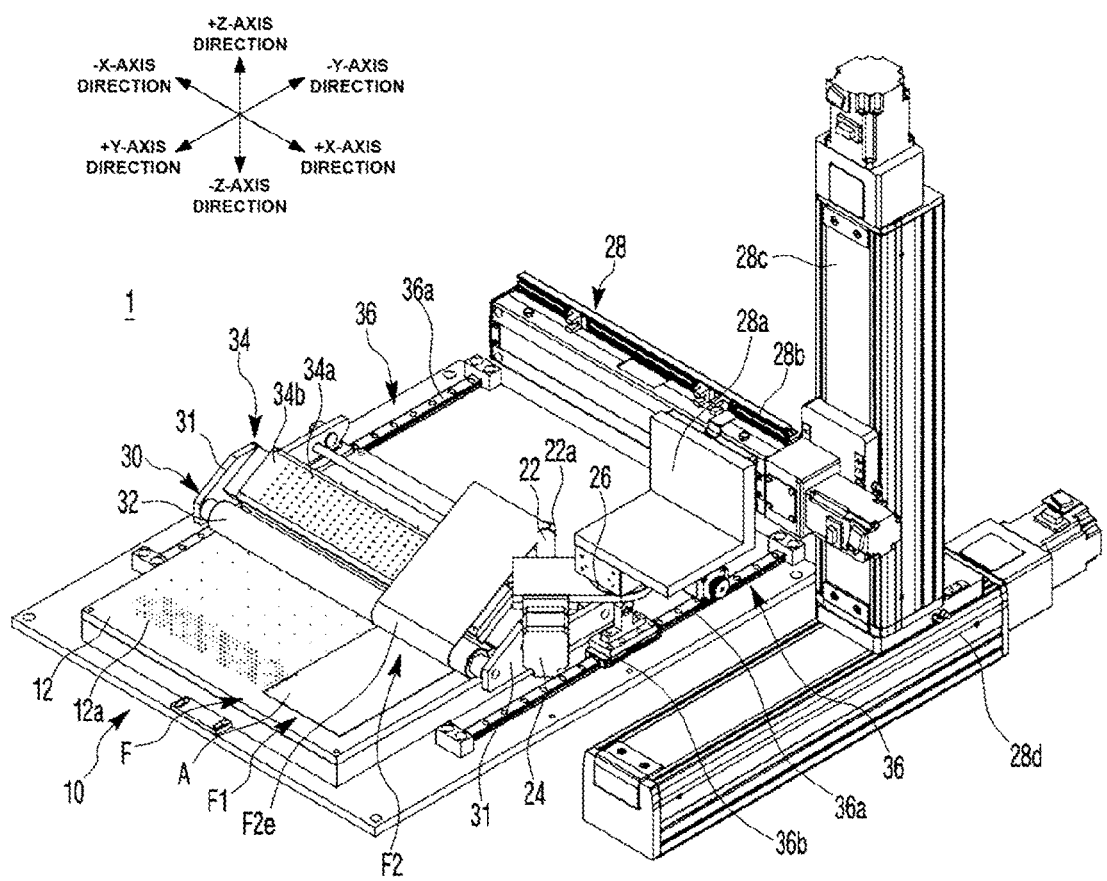

[FIG. 8]
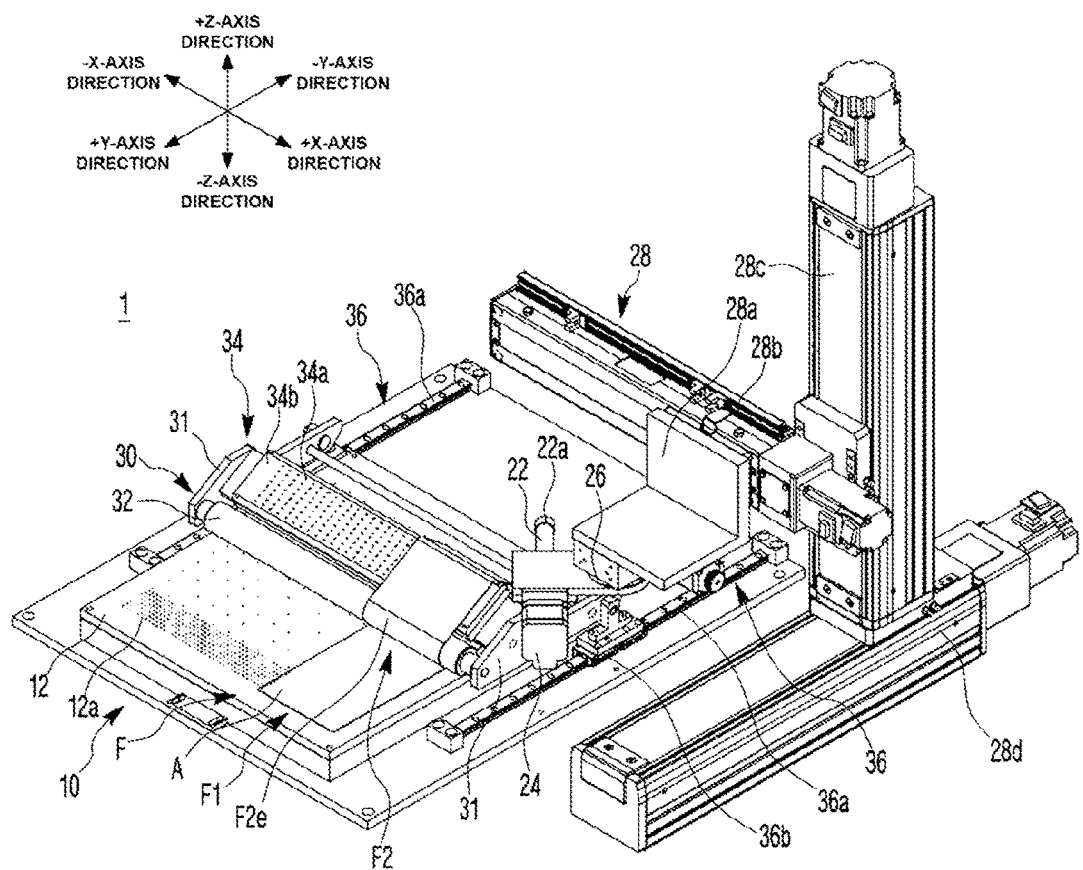

[FIG. 9]
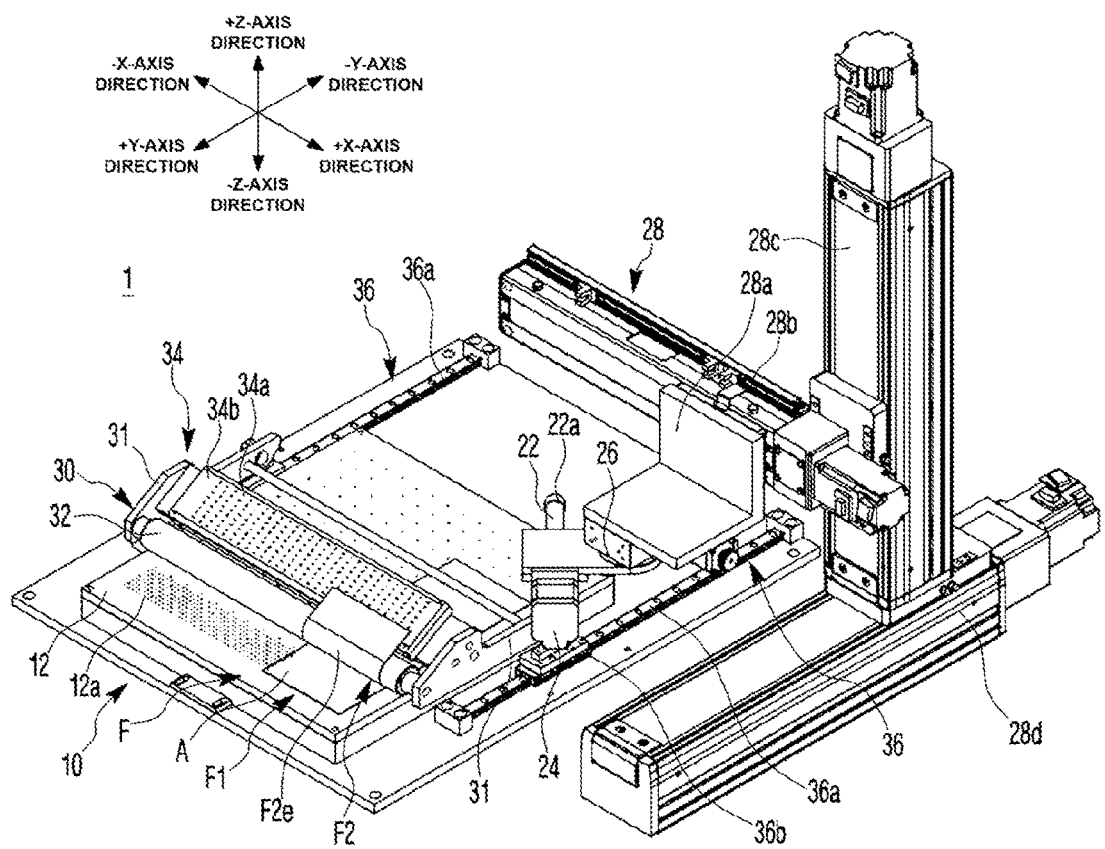

[FIG. 10]
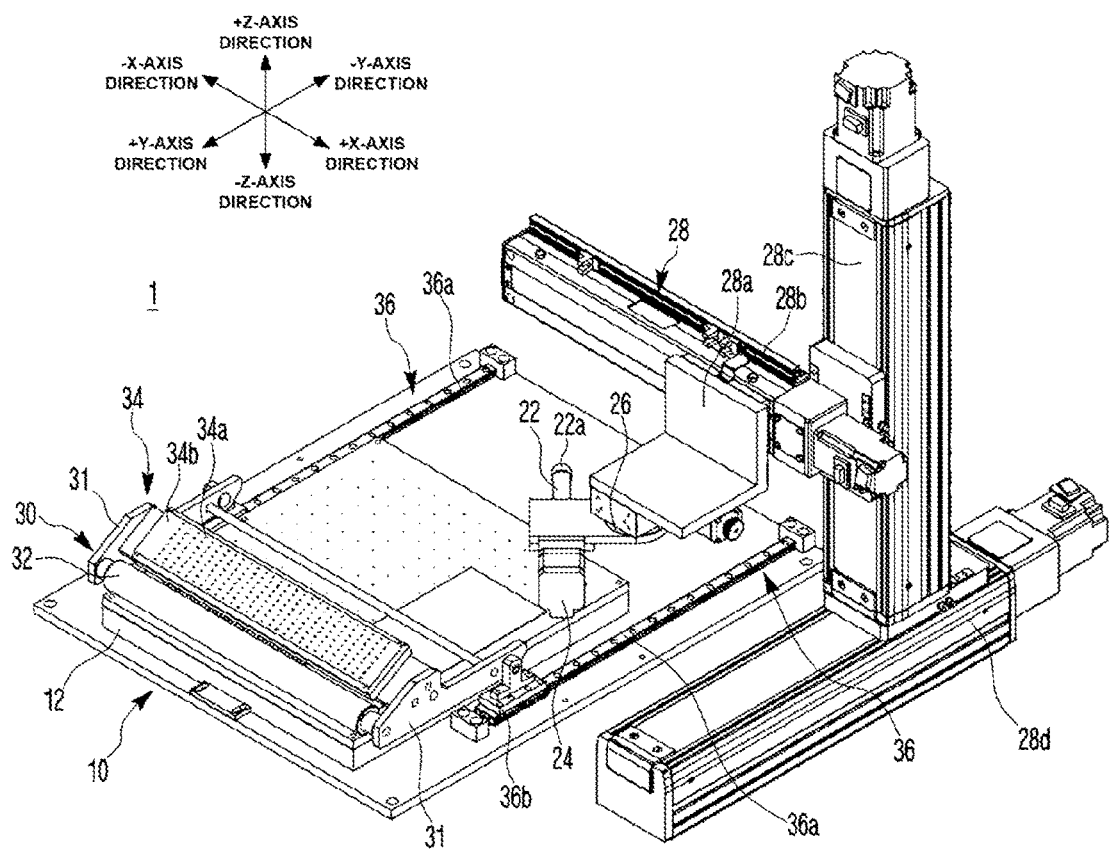

CURL REMOVING APPARATUS FOR MULTI-LAYER FILM

CROSS-REFERENCE TO RELATED APPLICATION

This application claims priority to Korean Patent Application No. 10-2020-0055511, filed on May 9, 2020, and Korean Patent Application No. 10-2021-0058084, filed on May 4, 2020, in the Korean Intellectual Property Office, the disclosure of which is incorporated herein by reference.

BACKGROUND OF THE INVENTION

1. Field of the Invention

The present invention relates to a curl removing apparatus for a multilayer film.

2. Description of the Related Art

In a production process of a functional film, internal stress may be generated between the functional film and a release film or between the functional film and a protective film. Such internal stress is generated in various cases, and for example, internal stress is generated when the protective film or the release film is attached to the functional film, is generated due to the effect of a roll pass for transferring the functional film using a roll, is generated when a functional product to which the protective film or the release film is attached is cut, or is generated when a completely produced functional film is stored. As such, internal stress may affect the flatness of the functional film, and thus the functional film may curl.

Curl of the functional film adversely affects a production process of various products using the functional film, and thus needs to be removed. Accordingly, a method for minimizing curl generated during a production process or storage of the functional film is used, but a certain amount of curl is inevitably generated due to tolerances or limitations of the production process. As such, the functional film with curl is classified as a defective article and cannot be sold.

SUMMARY OF THE INVENTION

Therefore, the present invention has been made in view of the above problems, and it is an object of the present invention to provide a curl removing apparatus for a multilayer film, having an improved structure for restoring a multilayer film with curl.

In accordance with the present invention, the above and other objects can be accomplished by the provision of a curl removing apparatus for a multilayer film for removing curl generated on a multilayer film including at least one of a first film having one surface on which a cohesive layer is formed and a second film attached to the cohesive layer, the apparatus including a fixing unit configured to fix the first film, a separation unit including a separation roller having an outer circumference with a separation cohesive layer formed thereon, to which the second film is detachably attached, and a first roller driving member configured to rotate and drive the separation roller to separate the second film attached to the separation cohesive layer from the cohesive layer of the first film while moving along the separation roller, and an attachment unit configured to reattach the second film separated from the cohesive layer of the first film to the cohesive layer of the first film.

The fixing unit may include an accommodation plate provided to accommodate the multilayer film thereon, and the multilayer film may be accommodated on the accommodation plate to make the first film face the accommodation plate and to expose the second film to an outside so as to fix the first film to the fixing unit.

The accommodation plate may have a plurality of first adsorption holes to which vacuum pressure for fixing the first film through vacuum adsorption is applied.

The separation unit may further include a first transfer unit configured to transfer the separation roller in at least one direction of an X-axis direction corresponding to a horizontal width direction of the accommodation plate, a Y-axis direction corresponding to a vertical width direction of the accommodation plate, or a Z-axis direction corresponding to a thickness direction of the accommodation plate.

The separation unit may further include a roller swing member configured to swing the separation roller around a Z axis.

The roller swing member may swing the separation roller around the Z axis at a predetermined angle with respect to the multilayer film, the first transfer unit may transfer the separation roller to attach one edge of the second film to the separation cohesive layer, and the first roller driving member may rotate and drive the separation roller to gradually separate the second film from the first film starting from the one edge.

The attachment unit may include an attachment roller that is reattached to the cohesive layer of the first film by pressing a separation region of the second film separated from the first film by the separation roller.

The attachment unit may further include a second transfer unit configured to reciprocate and transfer the attachment roller to sequentially press the separation region by the attachment roller.

The first transfer unit may transfer the separation roller in one direction to catch the separation region by the attachment roller, and the second transfer unit may transfer the attachment roller, by which the separation region is caught, in an opposite direction to the one direction to reattach the separation region to the cohesive layer of the first film.

The attachment unit may further include a tension application member configured to apply tension to the separation region when the separation region is reattached to the cohesive layer of the first film by the attachment roller.

The tension application member may be installed to be spaced apart from the accommodation plate in the one direction, and the first transfer unit may transfer the separation roller in the one direction to catch a lower portion of the separation region by the attachment roller and to accommodate an upper portion of the separation region on the tension application member.

The tension application member may have a plurality of second adsorption holes to which vacuum pressure for vacuum adsorption of the separation region is applied.

The vacuum pressure may be adjusted to be slidably moved in a state in which the separation region is vacuum-adsorbed to the second adsorption holes.

The tension application member may further include an inclined surface with a height that is gradually increased in the one direction and on which the separation region is accommodated, and the second adsorption holes may be formed in the inclined surface.

The tension application member may be installed to be reciprocated and transferred by the second transfer unit together with the attachment roller.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a cross-sectional view for explaining a layered structure of a multilayer film;

FIG. 2 is a schematic perspective view showing the configuration of a curl removing apparatus for a multilayer film according to an embodiment of the present invention;

FIG. 3 is a block diagram for explaining a control system of the curl removing apparatus for a multilayer film shown in FIG. 2;

FIGS. 4 to 7 are diagrams for explaining a method of separating a second film from a first film using the curl removing apparatus for a multilayer film shown in FIG. 2; and FIGS. 8 to 10 are diagrams for explaining a method of reattaching a second film to a first film using the curl removing apparatus for a multilayer film shown in FIG. 2.

DETAILED DESCRIPTION OF THE INVENTION

Hereinafter, some embodiments of the present invention will be described in detail with reference to the accompanying drawings. In the following description, like reference numerals designate like elements although the elements are shown in different drawings. Further, in the following description of the embodiments of the present invention, a detailed description of known functions and configurations incorporated herein will be omitted for clarity and brevity.

It will be understood that, although the terms first, second, A, B, (a), (b), etc. may be used herein to describe various elements of the present invention, these terms are only used to distinguish one element from another element and essential, order, or sequence of corresponding elements are not limited by these terms. Unless otherwise defined, all terms including technical and scientific terms used herein have the same meaning as commonly understood by one of ordinary skill in the art to which this present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a cross-sectional view for explaining a layered structure of a multilayer film. FIG. 2 is a schematic perspective view showing the configuration of a curl removing apparatus for a multilayer film according to an embodiment of the present invention. FIG. 3 is a block diagram for explaining a control system of the curl removing apparatus for a multilayer film shown in FIG. 2.

A curl removing apparatus 1 for a multilayer film according to an embodiment of the present invention may be an apparatus for removing curl generated on a multilayer film F. A stack structure of the multilayer film F is not particularly limited. For example, as shown in FIG. 1, the multilayer film F may include at least one of a first film F1 on which a cohesive layer A is formed, or a second film F2 that is detachably attached to the cohesive layer A of the first film F1.

The curl removing apparatus 1 for a multilayer film may be configured to restore the multilayer film F to a good product from which stress is removed by separating the second film F2 from the cohesive layer A of the first film F1, removing stress acting the first film F1 and the second film F2, and then reattaching the second film F2 to the cohesive layer A of the first film F1 when curl is generated on the multilayer film F due to stress acting between the first film F1 and the second film F2.

A type of the multilayer film F to which the curl removing apparatus 1 for a multilayer film is applicable is not particularly limited. For example, the first film F1 may be a functional film having a function corresponding to a product to be manufactured using the multilayer film F, and the second film F2 may be a protective film for protecting the first film F1, a release film that is detachably attached to the first film F1 so as to attach the first film F1 to an attachment target using the cohesive layer A of the first film F1 as necessary, or the like.

Referring to FIGS. 2 and 3, the curl removing apparatus 1 for a multilayer film may include a fixing unit 10 for fixing the multilayer film F through vacuum adsorption, a separation unit 20 for separating the second film F2 from the cohesive layer A of the first film F1, an attachment unit 30 for reattaching the second film F2 to the cohesive layer A of the first film F1, and a controller 40 for controlling overall driving of the curl removing apparatus 1 for a multilayer film.

As shown in FIGS. 2 and 3, the fixing unit 10 may include an accommodation plate 12 that is provided to accommodate the multilayer film F thereon and in which a plurality of first adsorption holes 12a is formed at a predetermined interval, and a first vacuum pump 14 for applying vacuum pressure to the first adsorption holes 12a of an accommodation plate 12.

As shown in FIG. 2, the separation unit 20 may include a separation roller 22 having an outer circumference with a separation cohesive layer 22a formed thereon, to which the second film F2 is detachably attached, a first roller driving member 24 shaft-coupled to the separation roller 22 and rotating and driving the separation roller 22, a roller swing member 26 to which the first roller driving member 24 is rotatably coupled and which swings the first roller driving member 24 and the separation roller 22 coupled thereto around the Z axis to adjust an angle between the multilayer film F accommodated on the accommodation plate 12 and the separation roller 22, and a first transfer unit 28 for reciprocating and transferring the roller swing member 26, and the first roller driving member 24 and the separation roller 22, which are coupled to the roller swing member 26, in at least one of three-axis directions of the X-axis direction, the Y-axis direction, or the Z-axis direction.

Here, the X-axis direction refers to a horizontal width direction of the accommodation plate 12, the Y-axis direction refers to a vertical width direction of the accommodation plate 12 orthogonal to the X-axis direction, and the Z-axis direction refers to a thickness direction of the accommodation plate 12 orthogonal to the X-axis direction and the Y-axis direction.

As shown in FIG. 2, the first transfer unit 28 may include a slider 28a to which the roller swing member 26 is coupled, an X-direction transfer unit 28b for reciprocating and transferring the slider 28a, the roller swing member 26 coupled thereto, and other components in the X-axis direction, a Z-direction transfer unit 28c for reciprocating and transferring the X-direction transfer unit 28b, the slider 28a coupled thereto, and other components in the Z-axis direction, and a Y-direction transfer unit 28d for reciprocating and transferring the Z-direction transfer unit 28c, the X-direction transfer unit 28b coupled thereto, and other components in the Y-axis direction.

As shown in FIGS. 2 and 3, the attachment unit 30 may include a support plate 31 spaced apart from the accommodation plate 12 by a predetermined interval, an attachment roller 32 rotatably coupled to the support plate 31, a second roller driving member 33 that is shaft-coupled to the attachment roller 32 and reciprocates and drives the attachment roller 32 to reattach the second film F2 separated from the cohesive layer A of the first film F1 to the first film F1 by pressing the second film F2 in the Z-axis direction by the attachment roller 32, a tension application member 34 that is coupled to the support plate 31, includes a plurality of second adsorption holes 34b formed therein at a predetermined interval, and applies tension to the second film F2 when the second film F2 is reattached to the first film F1 by the attachment roller 32, a second vacuum pump 35 for applying vacuum pressure to the second adsorption holes 34b of the tension application member, and a second transfer unit 36 for reciprocating and transferring the support plate 31, the attachment roller 32 coupled thereto, and the tension application member 34 in the Y-axis direction.

The number of the support plates 31 to be installed is not particularly limited. For example, the attachment unit 30 may include one pair of support plates 31 installed at a predetermined interval. In this case, one of opposite ends of the attachment roller 32 and one of opposite ends of the tension application member 34 may be coupled to any one of the support plates 31, and the other one of the opposite ends of the attachment roller 32 and the other one of the opposite ends of the tension application member 34 may be coupled to the other one of the support plates 31.

The attachment roller 32 may be installed to be spaced apart from the accommodation plate 12 in the +Z-axis direction by the thickness of the multilayer film F or an interval that is smaller than the thickness of the multilayer film F by a predetermined ratio so as to interpose the multilayer film F between the attachment roller 32 and the accommodation plate 12. The attachment roller 32 may be installed to have an axis of rotation in parallel to the X-axis direction, but the present invention is not limited thereto.

The tension application member 34 may be installed to be spaced apart from the attachment roller 32 in the −Y-axis direction of the accommodation plate 12. The tension application member 34 may have an inclined surface 34a with a height that is gradually increased towards a rear side of the attachment roller 32, that is, in the −Y-axis direction, and the second adsorption holes 34b may be formed in the inclined surface 34a. The inclined surface 34a may be provided higher than the attachment roller 32, but the present invention is not limited thereto.

As shown in FIG. 2, the second transfer unit 36 may include a rail 36a that extends a long way in the Y-axis direction, and a transfer member 36b that is moveably installed on the rail 36a in the Y-axis direction, to which the support plate 31 is coupled, and which reciprocates and transfers the support plate 31, the attachment roller 32 coupled thereto, the tension application member 34, and other components along the rail 36a in the Y-axis direction.

The number of the second transfer units 36 to be installed is not particularly limited. For example, when the one pair of support plates 31 is installed, the attachment unit 30 may include one pair of second transfer units 36. In this case, any one of the support plates 31 may be coupled to the transfer member 36b included in any one of the second transfer units 36, and the other one of the support plates 31 may be coupled to the transfer member 36b included in the other one of the second transfer units 36.

FIGS. 4 to 7 are diagrams for explaining a method of separating a second film from a first film using the curl removing apparatus for a multilayer film shown in FIG. 2.

Hereinafter, a method of separating the second film F2 from the first film F1 will be described with reference to the drawings.

First, as shown in FIG. 2, the multilayer film F may be accommodated on the accommodation plate 12 so as to interpose a rear end of the multilayer film F between the attachment roller 32 and the accommodation plate 12. In more detail, the multilayer film F may be accommodated on the accommodation plate 12 in such a way that the first film F1 faces the accommodation plate 12 and the second film F2 exposes to the outside. The multilayer film F may be accommodated on the accommodation plate 12 to make a longitudinal direction of the multilayer film F positioned in parallel to the Y-axis direction, but the present invention is not limited thereto.

Then, the controller 40 may drive the first vacuum pump 14 of the fixing unit 10 to apply vacuum pressure to the first adsorption holes 12a of the accommodation plate 12. Then, the first film F1 may be fixed to the accommodation plate 12 through vacuum adsorption by the vacuum pressure applied to the first adsorption holes 12a of the accommodation plate 12.

Then, the controller 40 may drive the roller swing member 26 to swing the first roller driving member 24 and the separation roller 22 coupled thereto around the Z axis to position the separation roller 22 with the axis of rotation of the separation roller 22 at a predetermined angle based on a width direction of the multilayer film F.

Then, the controller 40 may drive the first transfer unit 28 to transfer the separation roller 22 to make the separation cohesive layer 22a of the separation roller 22 contact one edge of the second film F2. Then, one edge of the second film F2 may be attached to the separation cohesive layer 22a of the separation roller 22.

Then, as shown in FIG. 4, the controller 40 may drive the first roller driving member 24 to rotate and drive the separation roller 22 at a predetermined angle around an axis of rotation thereof and may drive the roller swing member 26 to swing the first roller driving member 24 and the separation roller 22 coupled thereto around the Z axis in such a way that one edge of the second film F2 attached to the separation roller 22 becomes separated from the cohesive layer A of the first film F1 towards the attachment roller 32 while moving along the separation roller 22. That is, the second film F2 may be separated from the first film F1 starting from one edge.

As shown in FIGS. 4 to 7, the controller 40 may drive the first transfer unit 28 to transfer the roller swing member 26 and the first roller driving member 24 coupled thereto in the −Y-axis direction so as to gradually separate the second film F2, one edge of which becomes separated from the cohesive layer A of the first film F1, in the −Y-axis direction. Simultaneously, as shown in FIG. 6, the controller 40 may drive the roller swing member 26 to swing the first roller driving member 24 and the separation roller 22 coupled thereto at a predetermined angle around the Z axis so as to position a boundary line Lb corresponding to a boundary between a portion of the second film F2, attached to the first film F1, and a portion of the second film F2, separated from the first film F1, in parallel to the attachment roller 32. In this case, as shown in FIG. 7, the controller 40 may drive the first roller driving member 24, the roller swing member 26, and the first transfer unit 28 to separate the remaining portion of the second film F2 (hereinafter referred to as the separation region F2e of the second film F2) except for a rear end of the second film F2, interposed between the attachment roller 32 and the accommodation plate 12, and in this case, may separate the separation region F2e of the second film F2 to catch a lower portion of the separation region F2e of the second film F2 by the attachment roller 32 and to accommodate an upper portion of the separation region F2e of the second film F2 on the inclined surface 34a of the tension application member 34.

Then, the controller 40 may drive the second vacuum pump 35 of the attachment unit 30 to apply vacuum pressure to the second adsorption holes 34b of the tension application member 34. Then, an upper portion of the separation region F2e of the second film F2 accommodated on the inclined surface 34a of the tension application member 34 may be vacuum-adsorbed to the second adsorption holes 34b of the inclined surface 34a. Here, the controller 40 may drive the second vacuum pump 35 to apply predetermined vacuum pressure to the second adsorption holes 34b of the inclined surface 34a in such a way that the separation region F2e of the second film F2 is slidably moved along the inclined surface 34a while vacuum-adsorbed to the second adsorption holes 34b of the inclined surface 34a. That is, the first vacuum pump 14 of the fixing unit 10 needs to apply vacuum pressure with relatively high intensity to the first adsorption holes 12a of the accommodation plate 12 in order to fix the first film F1 in the state in which it is impossible to move the first film F1, and in contrast, the second vacuum pump 35 of the attachment unit 30 may apply vacuum pressure with relatively low intensity to the second adsorption holes 34b of the inclined surface 34a to be slidably moved along the inclined surface 34a in the state in which the second film F2 is vacuum-adsorbed to the second adsorption holes 34b of the inclined surface 34a.

FIGS. 8 to 10 are diagrams for explaining a method of reattaching a second film to a first film using the curl removing apparatus for a multilayer film shown in FIG. 2.

Hereinafter, with reference to FIGS. 8 to 10, a method of reattaching the second film F2 separated from the cohesive layer A of the first film F1 to the cohesive layer A of the first film F1 will be described.

As shown in FIGS. 8 to 10, the controller 40 may drive the second transfer unit 36 to transfer the attachment roller 32 and the tension application member 34 in the +Y-axis direction, may drive the second roller driving member 33 to rotate and drive the attachment roller 32 around the axis of rotation, and may drive the second vacuum pump 35 to apply vacuum pressure to the second adsorption holes 34b of the inclined surface 34a.

Then, the attachment roller 32 may reattach the separation region F2e of the second film F2 to the first film F1 by sequentially pressuring the separation region F2e of the second film F2 in order of contact while processing in the Y-axis direction.

However, a region of the separation region F2e of the second film F2, which is accommodated on the inclined surface 34a, may be slidably moved along the inclined surface 34a while vacuum-adsorbed to the second adsorption holes 34b of the inclined surface 34a. Then, the separation region F2e of the second film F2 may be reattached to the first film F1 in which predetermined tension is applied through vacuum pressure provided from the second vacuum pump 35 of the attachment unit 30. Then, the separation region F2e of the second film F2 may be reattached to the cohesive layer A of the first film F1 in an unfolded state without curl.

As shown in FIG. 8, one edge of the second film F2, which is attached to the separation cohesive layer 22a of the separation roller 22, may be smoothly separated from the separation cohesive layer 22a by pressing force applied to the separation region F2e of the second film F2 through the attachment roller 32 while the separation region F2e of the second film F2 is reattached to the first film F1. However, the present invention is not limited thereto, and the roller swing member 26 and the first transfer unit 28 may transfer the separation roller 22 so as to more smoothly separate one edge of the second film F2 from the separation cohesive layer 22a when the separation region F2e of the second film F2 is attached to the first film F1 by the attachment roller 32.

As described above, the curl removing apparatus 1 for a multilayer film may separate the second film F2 from the cohesive layer A of the first film F1 to remove stress acting between the second film F2 and the first film F1 and may then reattach the second film F2 to the cohesive layer A of the first film F1 in an unfolded state. As such, the curl removing apparatus 1 for a multilayer film may restore the multilayer film F with curl to a good product by removing curl from the multilayer film F with curl.

However, the separation region F2e of the second film F2 is separated and reattached in the state in which a rear end of the multilayer film F is interposed between the attachment roller 32 and the accommodation plate 12, and thus even if curl generated on the multilayer film F is removed using the curl removing apparatus 1 for a multilayer film, curl generated in the rear end of the multilayer film F may remain still. Thus, when curl remains still in the rear side of the multilayer film F, the remaining curl formed in the rear side of the multilayer film F may be removed by a curl removing operation once again in the state in which a front end of the multilayer film F is interposed between the attachment roller 32 and the accommodation plate 12 by reversing the multilayer film F.

The present invention provides a curl removing apparatus for a multilayer film, which separates a second film from a cohesive layer of a first film to remove stress acting between the second film and the first film and then reattaches the second film to the cohesive layer of the first film in a straightened state. As such, according to the present invention, the multilayer film with curl may be restored to a good flat product by removing curl from the multilayer film with curl generated due to stress.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A curl removing apparatus for a multilayer film for removing curl generated on a multilayer film including a first film having one surface on which a cohesive layer is formed and a second film attached to the cohesive layer, the apparatus comprising:
a fixing unit configured to fix the first film;
a separation unit including a separation roller having an outer circumference with a separation cohesive layer formed thereon, to which the second film is detachably attached, and a first roller driving member configured to rotate and drive the separation roller to separate the second film attached to the separation cohesive layer from the cohesive layer of the first film while moving along the separation roller; and an attachment unit configured to reattach the second film separated from the cohesive layer of the first film to the cohesive layer of the first film.

2. The apparatus according to claim 1, wherein:

the fixing unit includes an accommodation plate provided to accommodate the multilayer film thereon; and the multilayer film is accommodated on the accommodation plate to make the first film face the accommodation plate and to expose the second film to an outside so as to fix the first film to the fixing unit.

3. The apparatus according to claim 2, wherein the accommodation plate has a plurality of first adsorption holes to which vacuum pressure for fixing the first film through vacuum adsorption is applied.

4. The apparatus according to claim 2, wherein the separation unit further includes a first transfer unit configured to transfer the separation roller in at least one direction of an X-axis direction corresponding to a horizontal width direction of the accommodation plate, a Y-axis direction corresponding to a vertical width direction of the accommodation plate, or a Z-axis direction corresponding to a thickness direction of the accommodation plate.

5. The apparatus according to claim 4, wherein the separation unit further includes a roller swing member configured to swing the separation roller around the Z axis.

6. The apparatus according to claim 5, wherein:

the roller swing member swings the separation roller around the Z axis at a predetermined angle with respect to the multilayer film;

the first transfer unit transfers the separation roller to attach one edge of the second film to the separation cohesive layer; and the first roller driving member rotates and drives the separation roller to gradually separate the second film from the first film starting from the one edge.

7. The apparatus according to claim 4, wherein the attachment unit includes an attachment roller that is reattached to the cohesive layer of the first film by pressing a separation region of the second film separated from the first film by the separation roller.

8. The apparatus according to claim 7, wherein the attachment unit further includes a second transfer unit configured to reciprocate and transfer the attachment roller to sequentially press the separation region by the attachment roller.

9. The apparatus according to claim 8, wherein:

the first transfer unit transfers the separation roller in one direction to catch the separation region by the attachment roller; and the second transfer unit transfers the attachment roller, by which the separation region is caught, in an opposite direction to the one direction to reattach the separation region to the cohesive layer of the first film.

10. The apparatus according to claim 9, wherein the attachment unit further includes a tension application member configured to apply tension to the separation region when the separation region is reattached to the cohesive layer of the first film by the attachment roller.

11. The apparatus according to claim 10, wherein:

the tension application member is installed to be spaced apart from the accommodation plate in the one direction; and the first transfer unit transfers the separation roller in the one direction to catch a lower portion of the separation region by the attachment roller and to accommodate an upper portion of the separation region on the tension application member.

12. The apparatus according to claim 11, wherein the tension application member has a plurality of second adsorption holes to which vacuum pressure for vacuum adsorption of the separation region is applied.

13. The apparatus according to claim 12, wherein the vacuum pressure is adjusted such that the separation region is slidably moveable in a state in which the separation region is vacuum-adsorbed to the second adsorption holes.

14. The apparatus according to claim 12, wherein:

the tension application member further includes an inclined surface with a height that is gradually increased in the one direction and on which the separation region is accommodated; and the second adsorption holes are formed in the inclined surface.

15. The apparatus according to claim 11, wherein the tension application member is installed to be reciprocated and transferred by the second transfer unit together with the attachment roller.

* * * * *